US011262825B2

United States Patent
Durham et al.

(10) Patent No.: US 11,262,825 B2
(45) Date of Patent: Mar. 1, 2022

(54) POWER SUPPLY IDENTIFICATION

(71) Applicant: HEWLETT-PACKARD DEVELOPMENT COMPANY, L.P., Houston, TX (US)

(72) Inventors: Michael R. Durham, Tomball, TX (US); Mark A. Piwonka, Tomball, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 111 days.

(21) Appl. No.: 16/179,025

(22) Filed: Nov. 2, 2018

(65) Prior Publication Data

US 2020/0142462 A1 May 7, 2020

(51) Int. Cl.
*G06F 1/26* (2006.01)
*G06F 1/28* (2006.01)
*H01R 13/66* (2006.01)

(52) U.S. Cl.
CPC ............... *G06F 1/263* (2013.01); *G06F 1/28* (2013.01); *H01R 13/6683* (2013.01)

(58) Field of Classification Search
CPC ........................................................ G06F 1/26
See application file for complete search history.

(56) References Cited

U.S. PATENT DOCUMENTS

| 6,161,027 | A * | 12/2000 | Poirel | H04W 88/02 |
| | | | | 455/572 |
| 9,582,054 | B2 | 2/2017 | Yang et al. | |
| 9,703,367 | B2 | 7/2017 | Atkinson et al. | |
| 2005/0086545 | A1* | 4/2005 | Breen | G06F 1/305 |
| | | | | 713/300 |
| 2006/0020833 | A1* | 1/2006 | Critz | G06F 11/00 |
| | | | | 713/300 |
| 2007/0220291 | A1* | 9/2007 | Stufflebeam | G06F 1/3203 |
| | | | | 713/320 |
| 2011/0179291 | A1 | 7/2011 | Weng et al. | |
| 2016/0161568 | A1* | 6/2016 | Sawyers | H02M 1/10 |
| | | | | 307/650 |

FOREIGN PATENT DOCUMENTS

CN          201490901          5/2010

* cited by examiner

*Primary Examiner* — Kim Huynh
*Assistant Examiner* — Eric Chang
(74) *Attorney, Agent, or Firm* — Fabian VanCott

(57) ABSTRACT

A circuit for identifying a power supply may include a voltage divider to divide an identification voltage from the power supply. The output of the voltage divider is electrically coupled to an adapter identification pin of a controller to identify the power supply.

16 Claims, 6 Drawing Sheets

POWER SUPPLY IDENTIFICATION

BACKGROUND

Computing devices have become ubiquitous throughout the modern era. These computing devices vary widely in their capabilities and sizes, and draw different levels of electrical power in a similar manner. External or internal power supplies, sometimes referred to as AC adapters, power bricks, power adapters or similar terms, are used to power a computing device, and are provided in various sizes that produce different levels of power to a computing device. A power supply is used with computing devices that consume power but do not contain internal components to derive the voltage (V) and power from a power source such as an electrical power grid.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
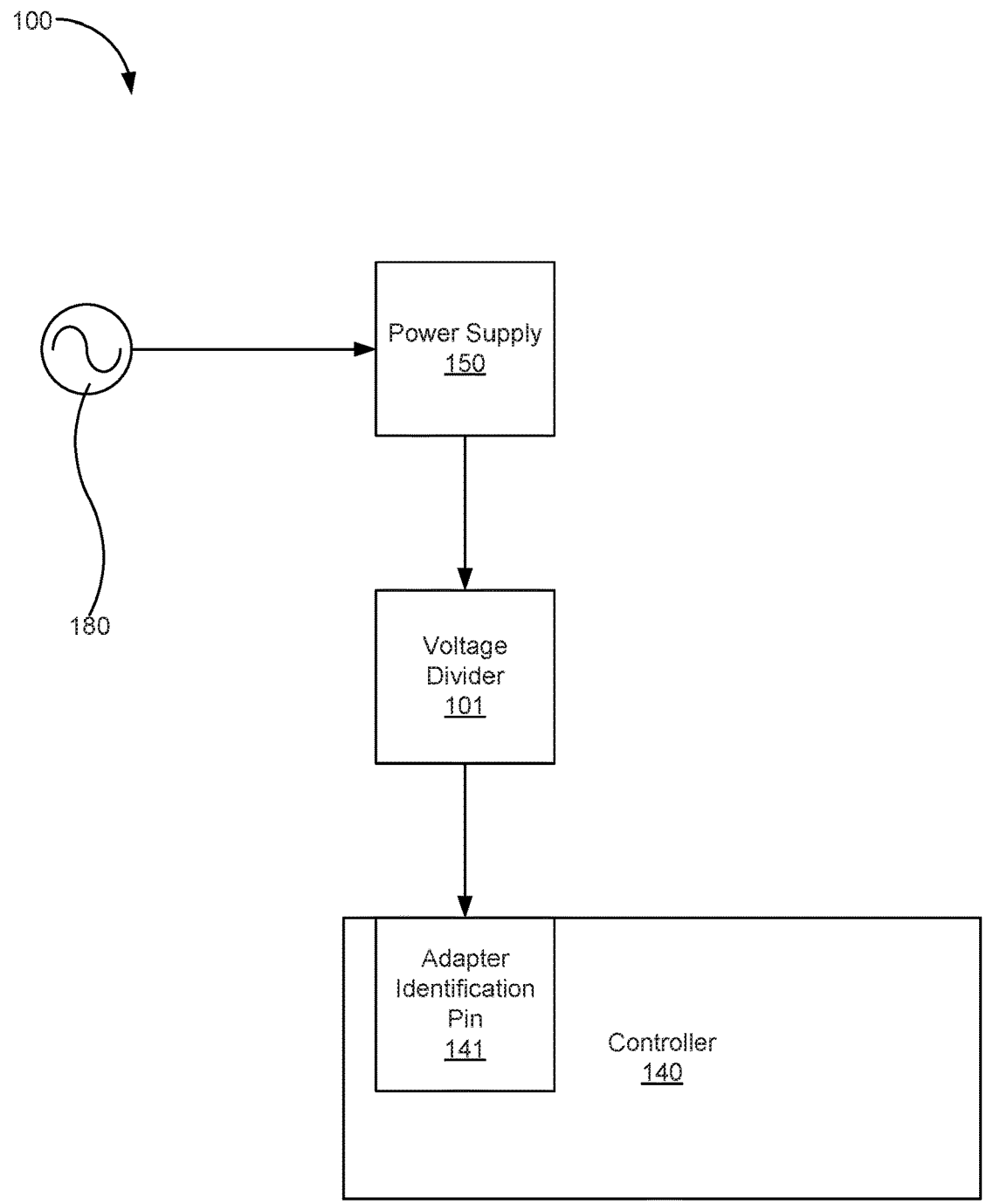
FIG. 1 is a block diagram of a circuit for identifying a power supply, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As stated herein, a power supply is used to provide electrical power to computing devices that consume power but do not contain internal components to derive the voltage (V) and power from a power source such as an electrical power grid. Computing devices may operate consuming various levels of power to process data and perform other tasks. Some computing devices provide or allow support for multiple power sources such as different power adapters that supply different levels of power to be used in connection with the computing device. The computing device in these instances may support a number of configurations and options including operating at these different power levels at full performance or a reduced performance level based on the power available from the power source. If a limited number of power supplies are detected, then the configurations and options of the computing device may be limited.

In these multiple-power-level-consuming computing devices, it is possible the configuration and options of the computing device may be blindly supported. However, there is no way for sure of knowing the right size power source is attached in, for example, watts. Thus, in some examples, it may be useful for a computing device to be able to identify or automatically detect the exact size power source with one circuit for all possible power sources that may be attached to the computing device. This would allow the basic input/output system (BIOS) of the computing device to know the exact size of the power source and to configure the power-consuming elements of the computing device to support all options at full performance or reduced performance based on the electrical power available.

Examples described herein provide for a circuit for identifying a power supply. The circuit for identifying a power supply includes a voltage divider to divide an identification voltage from the power supply. The output of the voltage divider is electrically coupled to an adapter identification pin of a controller to identify the power supply. The circuit may include an electrical connection between a switch in parallel with a first resistor of the voltage divider and a general-purpose input/output (GPIO) pin of the controller. In response to a voltage at the adapter identification pin exceeding a threshold voltage, the switch reduces the voltage to the adapter identification pin and delivers a voltage to the GPIO pin. The reduced voltage is within a voltage range measurable at the adapter identification pin.

The controller may be a super input/output (SIO) controller integrated circuit. A first resistor and a second resistor of the voltage divider may include a tolerance that varies ±0.5% or less. The circuit may include an analog-to-digital converter (ADC) within the controller. The reduced voltage may be within a voltage range measurable by the ADC. The circuit may include a power state indication circuit coupled to a power state pin of the controller to define a power state of a computing device.

Examples described herein also provide for a system for identifying a power supply may include a controller of a computing device to control voltage supplied to the computing device and a power supply identification circuit coupled to the controller. The power supply identification circuit includes a voltage divider to divide an identification voltage from the power supply. The output of the voltage divider is electrically coupled to an adapter identification pin of the controller to identify the power supply.

The system may include an electrical connection between a switch in parallel with a first resistor of the voltage divider and a general-purpose input/output (GPIO) pin of the controller. In response to a voltage at the adapter identification pin exceeds a threshold voltage, the switch reduces the voltage to the adapter identification pin and delivers a voltage to the GPIO pin. Further the reduced voltage may be within a voltage range measurable at the adapter identification pin.

The controller may be a super input/output (SIO) controller integrated circuit. A first resistor and a second resistor of the voltage divider may include a tolerance that varies ±0.5% or less. The system may include an analog-to-digital converter (ADC) within the controller. The reduced voltage may be within a voltage range measurable by the ADC, the range comprising 2.5 volts or less. The voltage range in one example may be dependent ADC input limitations and may vary. The system may include a power state indication circuit coupled to a power state pin of the controller to indicate a power state of the computing device. The power supply may be an internal component of the computing device.

Examples described herein also provide for a method of identifying a power supply. The method may include, with a voltage divider of a power supply identification circuit electrically coupled to an adapter identification pin of a controller, dividing an identification voltage from the power supply. The method may also include identifying the power supply based on the voltage sensed at the adapter identification pin.

The method may include storing data defining the identified power supply in a data storage device. Further, the method may include instructing a computing device to which the power supply identification circuit is coupled to operate at an alternative performance level based on the identified power supply. Dividing the identification voltage from the power supply may include, with an electrical connection between a switch in parallel with a first resistor of the voltage divider and a general-purpose input/output (GPIO) pin of the controller, reducing the voltage to the adapter identification pin and delivering a voltage to the GPIO pin in response to a voltage at the adapter identification pin exceeding a threshold voltage. Further, the method may include, with a power state indication circuit coupled to a power state pin of the controller, determining a power state of a computing device to which the power supply identification circuit is coupled.

Turning now to the figures, FIG. 1 is a block diagram of a circuit (100) for identifying a power supply (150), according to an example of the principles described herein. The circuit (100) may include a voltage divider (101) to divide an identification voltage from the power supply (150). In the examples described herein, the power supply may be an external power supply external to a computing device such as, for example, an alternating current (AC) adapter or a power brick. In another example, the power supply (150) may be an internal power supply such as, for example, a silver box that is housed within the computing device.

The power supply (150) draws electrical power from an alternating current (AC) power source (180) such as electrical power obtained from an electric power grid. The power source (180) may be any general-purpose AC electric power supply, and may be the form of electrical power that is delivered to homes and businesses through electrical wall outlets.

In the examples described herein, the output of the voltage divider (101) is electrically coupled to an adapter identification pin (141) of a controller (140) to identify the power supply (150). Identification of the power supply (150) allows the computing device to which the power supply (150) is coupled to know how to operate based on the level of power provided.

The controller (140) may include an embedded controller (EC) or a super input/output (SIO) device used to handle various system tasks that the operating system of the computing device does not handle including, for example, power-related processing. The adapter identification pin (141) of the controller (140) may be one of many pins of the controller (140) through which the identification of the power source coupled to and powering the computing device in which the controller (140) is contained.

The voltage divider (101) may be any passive linear circuit that produces an output voltage that is a fraction of its input voltage. In one example, a first resistor and a second resistor of the voltage divider (101) may have a tolerance that varies ±0.5% or less in order to provide a precise identification of the power source at the adapter identification pin (141).

As described herein the circuit including the voltage divider (101) may include an electrical connection between a switch in parallel with a first resistor of the voltage divider (101) and a general-purpose input/output (GPIO) pin (FIG. 3, 142) of the controller (140). In response to a voltage at the adapter identification pin (141) exceeding a threshold voltage, the switch may reduce the voltage to the adapter identification pin (141) and deliver a voltage to the GPIO pin. The reduced voltage provided via the switch and the GPIO pin (FIG. 3, 142) may be within a voltage range measurable at the adapter identification pin (141).

In one example, the controller (140) may include an analog-to-digital converter (ADC). An ADC converts input analog voltage or current at the adapter identification pin (141) to a digital number representing the magnitude of the voltage or current. This conversion performed by the ADC may allow the computing device to utilize the digital signal representing the identification of the power supply (150) in its digital processing and storage of data regarding at least the identification of the power supply (150). The reduced voltage provided via the switch and the GPIO pin (FIG. 3, 142) may be reduced to within a voltage range measurable by the ADC.

As described herein, the circuit (100) may include a power state indication circuit coupled to a power state pin (FIG. 3, 143) of the controller (140) to define a power state of a computing device in which the circuit (100) and the controller (140) are included. The signal detected at the power state pin (FIG. 3, 143) of the controller (140) may define an advanced configuration and power interface (ACPI) state at which the computing device is to operate. ACPI provides an open standard that operating systems of computing devices may use to discover and configure computer hardware components, to perform power management by, for example, putting unused components to sleep, and to perform status monitoring. The power states may include an S0 power state defining a working state where the computing device is running and the central processing unit (CPU) executes instructions; an S1 power state defining a Power on Suspend (POS) state where the processor caches are flushed, the CPU stops executing instructions, and the power to the CPU and random access memory (RAM) is maintained; an S2 power state defining a CPU powered off sate where the cache is flushed to RAM; an S3 power state referred to as Standby, Sleep, or Suspend to RAM (STR) where the RAM remains powered; an S4 power state defining a Hibernation or Suspend to Disk state where all content of the main memory is saved to non-volatile memory such as a hard drive, and the system is powered down; or an S5 power state referred to as a Soft Off where the power supply (150) still supplies power, at a minimum, to the power button to allow return to the S0 state and where a full reboot is performed and no previous content is retained. More details regarding the circuit (100) are described herein in connection with FIGS. 2 through 6.

Figure 2:
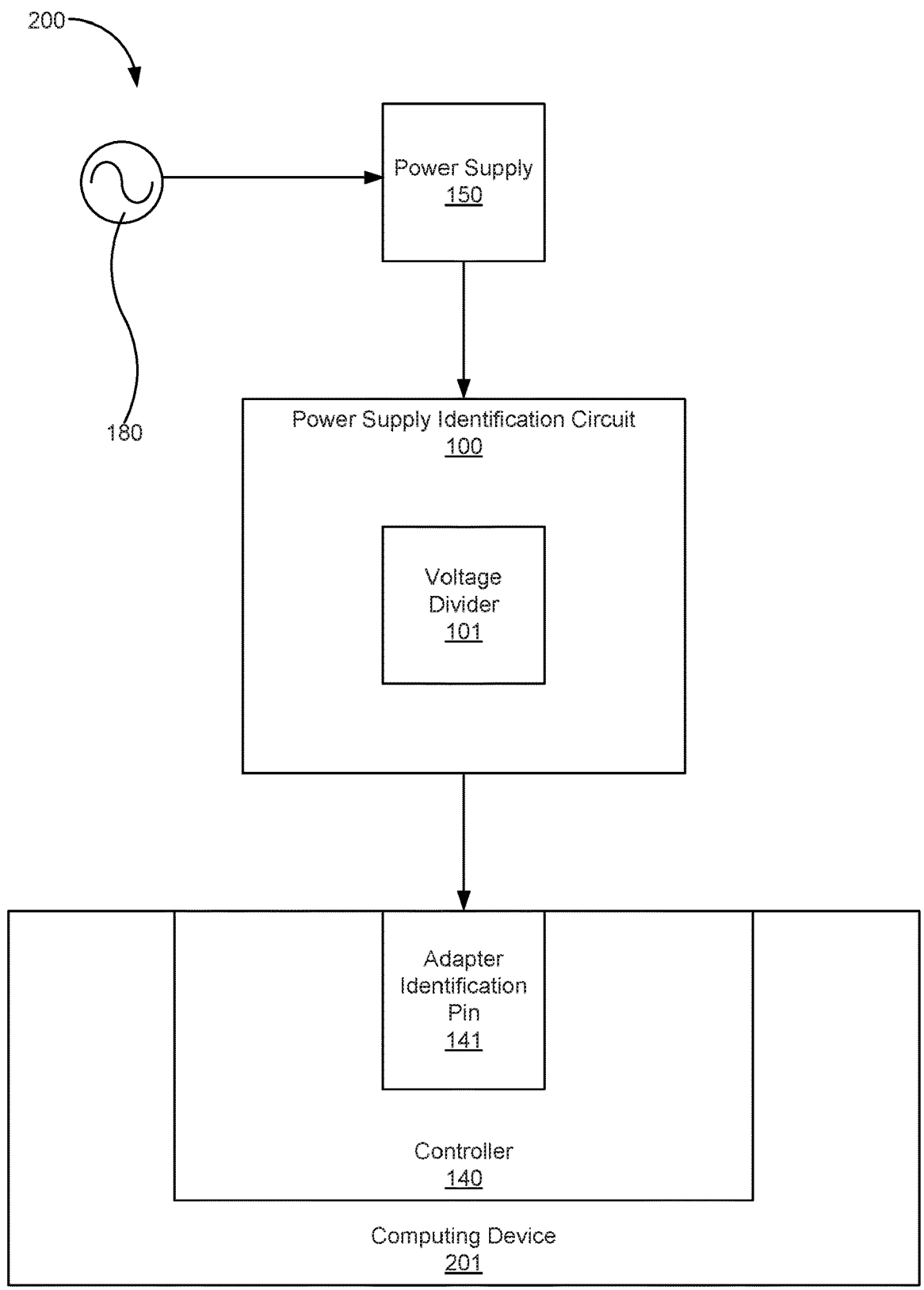
FIG. 2 is a block diagram of a system for identifying a power supply, according to an example of the principles described herein.

FIG. 2 is a block diagram of a system (200) for identifying a power supply (150), according to an example of the principles described herein. The system (200) includes a controller (140) within a computing device (201) to control voltage supplied to the computing device (201). The computing device (201) coupled to the power supply identification circuit (100) may be any electricity receiving device including for example, desktop computing devices, laptop computing devices, display devices, smart display devices, smart phones, tablet computing devices, and other electricity consuming devices.

A power supply identification circuit (100) is coupled to the controller (140). The power supply identification circuit (100) includes a voltage divider (101) to divide an identification voltage from the power supply (150) as described herein. The output of the voltage divider (101) is electrically coupled to an adapter identification pin (141) of the controller (140) to identify the power supply (150). In one example, the power supply identification circuit (100) may reside within the computing device (201). In another example, the power supply identification circuit (100) may be associated with a separate device from the computing device (201). Other elements included within the system (200) are described above in connection with FIG. 1, and in more detail herein.

Figure 3:
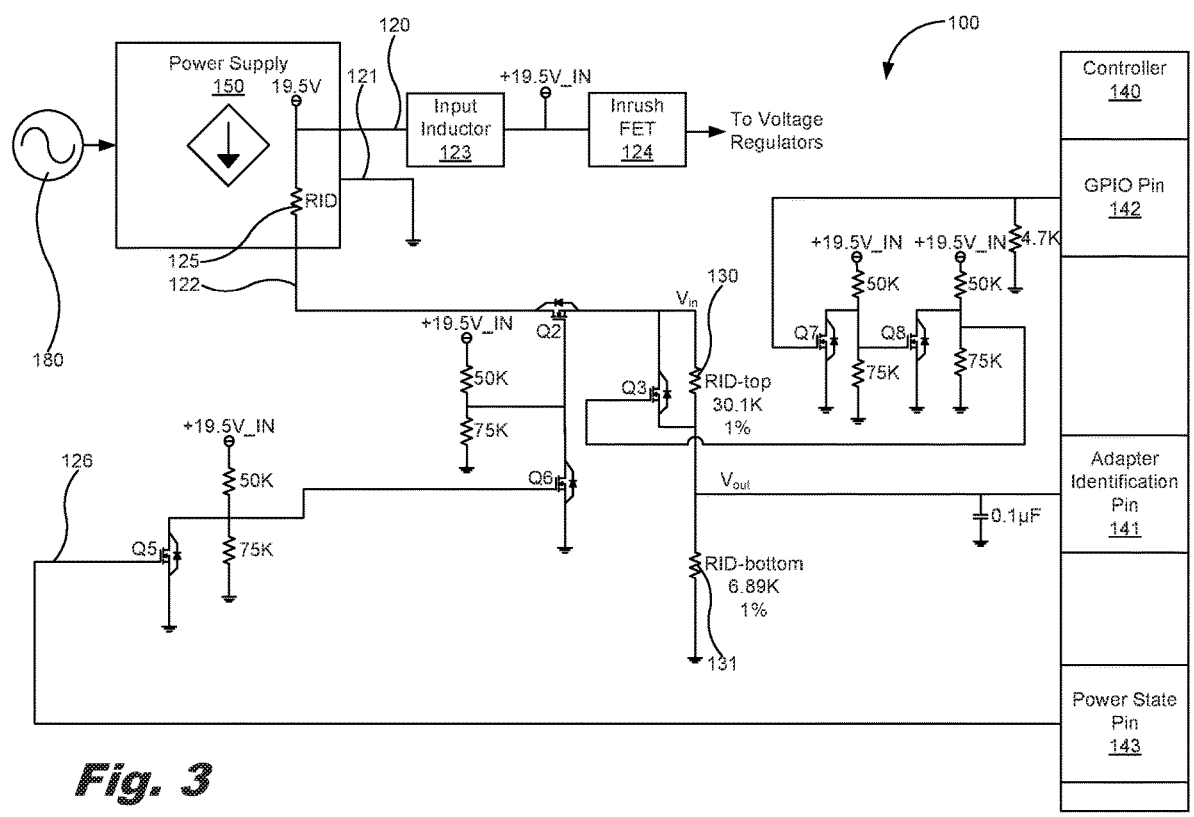
FIG. 3 is a circuit diagram of a power supply identification circuit, according to an example of the principles described herein.

FIG. 3 is a circuit diagram of a power supply identification circuit (100), according to an example of the principles described herein. The power supply (150) is coupled to the power source (180) and includes an adapter that includes three pins: a power pin (120), a ground pin (121), and a resistor identification (RID) pin (122). The power supply identification circuit (100) includes several instances of voltage in nodes designated by "+19.5 V_IN." These voltage in nodes indicate voltage into that portion of the circuit (100), and connections to the power supply (150) are omitted for simplicity in the depicting the power supply identification circuit (100). Further, although not shown, the voltage input to the circuit (100) also powers the controller (140).

The power pin (120) connect to an input inductor (123) and inrush field effect transistor (FET) (124). The input inductor (123) removes ripple which is a multiple of the frequency from the direct current (DC) output, and prevents radio frequency interference from being transmitted to the computing device (201) in which the power supply identification circuit (100) is included. The inrush FET (124) is a circuit located on a motherboard of the computing device (201) that limits the in-rush current on the motherboard such that the power supply (150) is not overloaded and cause damage to elements of the overall system.

The RID resistor (125) is a resistor device that, through its value of electrical resistance measured in Ohms, identifies the wattage of the power supply (150). For example, a 65 W power supply (150) may include a 383K resistor, and a 90 W power supply (150) may include a 249K resistor. Thus, by providing a unique resistance for each power supply (150) in the form of differing RID resistors, the RID resistor (125) serves as an identification for the power supply (150). It is this power supply identification that the power supply identification circuit (100) assists in identifying and providing to the controller (140) and computing device (201) in order to determine what size (in watts) the power supply (150) is. Table 1 below includes a list of supported power supplies (150) and actually built power supplies, and corresponding wattages and RID values for those power supplies (150).

TABLE 1

Supported power supplies and corresponding wattages and RID values

| Possible Power Supplies | Actual Power Supplies Built | RID (kΩ) |
|---|---|---|
| No EPS | | |
| ≥20 W | | 845 |
| ≥30 W | | 698 |

TABLE 1-continued

Supported power supplies and corresponding wattages and RID values

| Possible Power Supplies | Actual Power Supplies Built | RID (kΩ) |
|---|---|---|
| ≥40 W | | 590 |
| ≥50 W | 50 W | 499 |
| ≥65 W | 65 W | 383 |
| ≥90 W | 90 W | 249 |
| ≥120 W | 120 W | 221 |
| ≥135 W | 135 W | 169 |
| ≥150 W | 150 W | 130 |
| ≥180 W | 180 W | 100 |
| ≥200 W | 200 W | 85.2 |
| ≥230 W | 230 W | 72.8 |
| ≥310 W | | 62.3 |
| ≥350 W | | 54.5 |
| ≥ | | 45.8 |

A number of resistors, capacitors, and transistors may be included throughout the power supply identification circuit (100). The resistors are indicated with a value such as 4.7K, 50K, and 75K designating the resistance values and designations. The transistors are identified as Q2, Q3, Q5, Q6, Q7, and Q8, and may be any semiconductor device used to amplify or switch electronic signals and electrical power. In one example, the transistors (Q2, Q3, Q5, Q6, Q7, Q8, collectively referred to herein as Q) may be bipolar junction transistors (BJT), junction gate field-effect transistors (JFET), metal-oxide semiconductor field-effect transistors (MOSFET), other transistors types, or combinations thereof. In one example, the transistors (Q) may be 2N7002 N-channel enhancement mode MOSFETs developed and manufactured by Diodes Incorporated. The capacitors are indicated using a value expressed in farads, and, in the case of the one capacitor included in this example of the power supply identification circuit (100) has a capacitance of 0.1 microfarads (μF).

The power state line (126) provides a signal to the power state pin (143) of the controller (140) to instruct the computing device (201) to turn on and to indicate what state (i.e., S0, S1, S2, S3, S4, S5) the computing device (201) is in and drives it into that state. The purpose for the power state line (126) and the power state pin (143) of the controller (140) is that the power supply (150) serves a dual function with respect to the adapter identification pin (141). After an initial power-up from "no AC" to "AC inserted," the value at the adapter identification pin (141) is read when the computing device's (201) power is low in order to minimize the impact on the 19.5 ($V_{in}$) voltage. This light-load state experienced at the initial power-up of the computing device (201) before too many elements of the computing device (201) are enabled may be measured instead of a loaded state. After reading the power at the adapter identification pin (141) to determine the power adapter size, the power supply (150) will be at a "dual function" state. The second function of the dual function nature of the circuit (100) begins to source current from the adapter identification pin (141) to indicate that the power supply (150) is nearing its maximum wattage. In this manner, the dual function may source current into the adapter identification pin (141), and, for this reason, the connection between the power supply (150) and the adapter identification pin (141) may be broken so the adapter identification pin (141) is not damaged. Thus, when the computing device (201) enters an S0 power state, the power source (150) may reach its maximum power and the adapter identification pin (141) may be sourcing current which would damage the adapter identification pin (141). The dual function is one of the reasons for the inclusion of switch (Q2) in the circuit (100) that is controlled by the power state pin (143).

Having described the various elements of the power supply identification circuit (100), the voltage dividing function of the power supply identification circuit (100) and the manner in which the voltage divider (101) identifies the power supply (150) coupled to the computing device (201) will now be described. The voltage divider (101) may include a first resistor (130) and a second resistor (131) that may be referred to as RID-top and RID-bottom, respectively. These two resistors (130, 131) are arranged in series to create and the output voltage ($V_{out}$) that is fed to the adapter identification pin (141) of the controller (140) using a connection between RID-top (130) and RID-bottom (131) identifies the wattage of the power supply (150). The input voltage ($V_{in}$) is the voltage provided by the RID pin (122) and may be between approximately 0V and 5V or approximately 2.5V. As the input voltage ($V_{in}$) is divided by the voltage divider (101), the output voltage ($V_{out}$) may be read by the controller (140) and the controller may identify the wattage of the power supply (150) using, for example, Table 1 above or a look-up table stored within a data storage device of the computing device (201). Thus, a derived value from the voltage divider (101) serves to identify the power supply (150).

In one example, the RID-top (130) may have a resistance value of 30.1 ohms ($\Omega$) and the RID-bottom (131) may have a resistance value of 6.89 ohms ($\Omega$). The RID-top (130) and RID-bottom (131) may also have a tolerance of 1% or ±0.5% or less meaning that any manufacturing tolerances are much higher and the RID-top (130) and RID-bottom (131) are very accurate as to their resistance values.

In some examples, the adapter identification pin (141), functioning as an ADC input, may include a voltage range of approximately 2.5V or less (based on the ADC voltage range) creating a threshold voltage. This threshold voltage may be stored in a register of the controller (140). Thus, the divided or reduced voltage provided by the voltage divider (101) should be approximately equal to or less than 2.5V (based on the ADC voltage range). In some instances, the RID (125) may output too large of a voltage as the input voltage ($V_{in}$) that the divided output voltage ($V_{out}$) is greater than the voltage threshold of the adapter identification pin (141) and the ADC. In this case, a general-purpose input/output (GPIO) pin (142) in series with the RID-top (130) serves to reduce the input voltage ($V_{in}$), and, in turn, reduces the divided output voltage ($V_{out}$) that is divided by the voltage divider (101) and sensed at the adapter identification pin (141). The transistor (Q3) in parallel with RID-top (130) acts as a gate to open or remain closed based on the value of the input voltage ($V_{in}$) from the RID (125) of the power supply (150). When the transistor (Q3) is in an open state the full resistance from RID-top (130) is effectual within the power supply identification circuit (100). When the transistor (Q3) is in a closed state the resistance of RID-top (130) moves to zero, RID-top (130) is bypassed, and the voltage rates are shifted down such that the output voltage ($V_{out}$) is within the ADC range.

When the input voltage ($V_{in}$) is below a threshold, the transistor (Q3) remains in a closed state, and when the input voltage ($V_{in}$) rises above the threshold, the gate of the transistor (Q3) opens and allows current to flow to the GPIO pin (142). In this manner, the voltage divider (101) and the GPIO pin (142) act together to create a situation where any number of different power supplies (150) with differing wattages and RIDs (125) that provide different input voltages ($V_{in}$) and output voltages ($V_{out}$) may be coupled to the power supply identification circuit (100) without a plurality of GPIO pins being utilized to individually identify the power supplies (150). This reduces the number of pins taken up in identifying the power supplies (150).

Referring again to Table 1, in an example, ranges of wattages of power supplies (150) may produce input voltage ($V_{in}$) and output voltage ($V_{out}$) output by the voltage divider (101) that are below the voltage threshold keeping the transistor (Q3) closed or off and keeping the GPIO pin (142) in a low state. In contrast, ranges of wattages of power supplies (150) may produce input voltage ($V_{in}$) and output voltage ($V_{out}$) output by the voltage divider (101) that are above the voltage threshold causing the transistor (Q3) to open or switch on and causing the GPIO pin (142) to move to a high state. As one example, power supplies (150) that provide between 45 W and 150 W may produce voltages that keep the transistor (Q3) closed or off and keep the GPIO pin (142) in a low state. In contrast, power supplies (150) that provide between 150 W and 350 W, may produce voltages that cause the transistor (Q3) to open or switch on and cause the GPIO pin (142) to move to a high state.

As described herein, the power supply (150) may be embodied as a "silver box" where the power supply unit of the computing device (201) is housed in and internal to the computing device (201). In this example, the power supply identification circuit (100) may include a different electrical layout than that depicted in FIG. 3. First, a silver box implementation would eliminate the use of a GPIO and power state control signals to the GPIO pin (142) and the power state pin (143), respectively. Because the internal, silver box power supply has fewer unique sizes, the detection of the power supply may be performed without a GPIO pin (142) and its associated circuitry. Further, in a silver box power supply (FIG. 3, 150) implementation, the circuit (100) may include the RID resistor (125), the second resistor (131), and the and the adapter identification pin (141).

Figure 4:
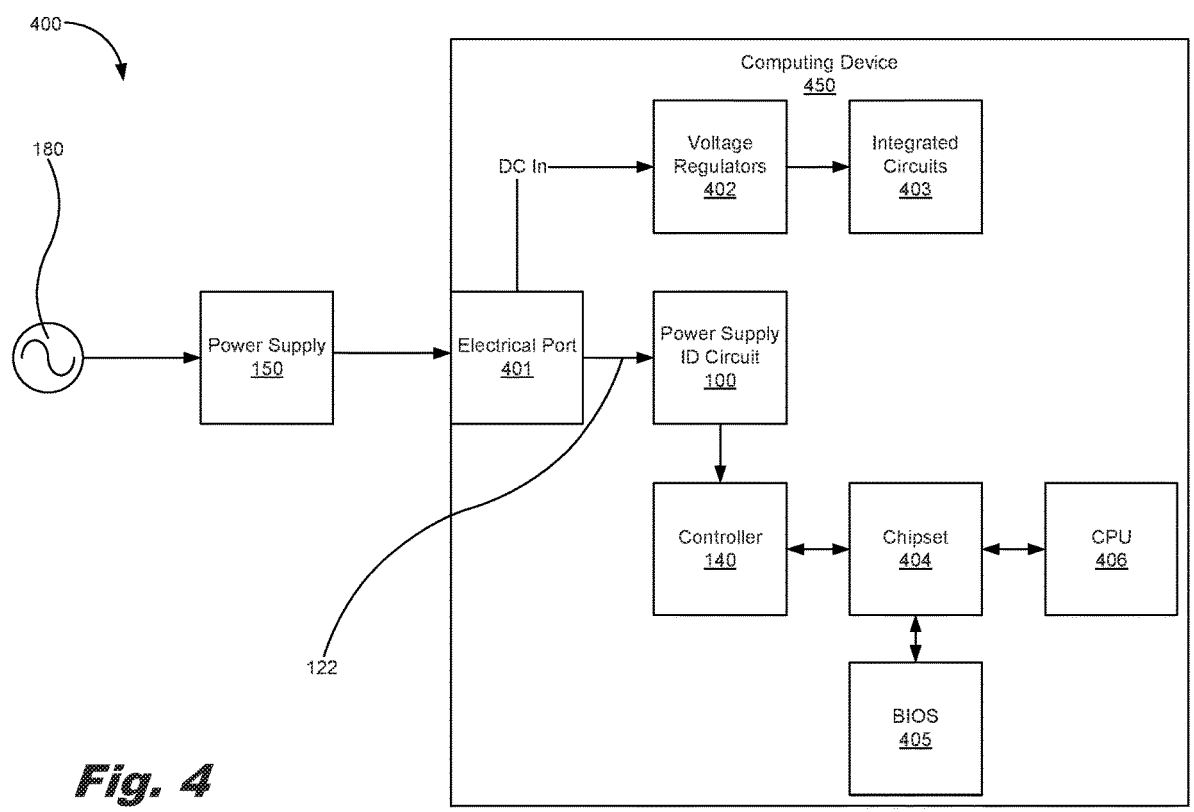
FIG. 4 is a block diagram of a system for identifying a power supply, according to an example of the principles described herein.

FIG. 4 is a block diagram of a system (400) for identifying a power supply (150), according to an example of the principles described herein. The system (400) includes the power supply (150) coupling a power source (180) to a computing device (450). The computing device (450) includes an electrical port (401) through which the power supply (150) electrically couples to the computing device (450).

DC voltage may be provided to voltage regulators (402) to regulate the voltages provided to at least one integrated circuit (403). The signal provided by the RID resistor (125) via the RID pin (122) of the power supply (150) may be provided to the power supply identification circuit (100). The signals received through the power supply identification circuit (100) including the identity of the power supply (150) (i.e., the wattage of the power supply (150)) obtained at the adapter identification pin (141) and the power state obtained at the power state pin (143) of the controller (140) may be sent on to the chipset (404), central processing unit (CPU) (406), and BIOS (405).

The chipset (404) and CPU (406) may use this data to determine what level of performance the computing device (450) may operate at. For example, if the power supply (150) provides a relatively lower level of power than the chipset (404) and CPU (406) may operate at, then the chipset (404) and CPU (406) may operate at a reduced performance level given the limited power available to the computing device (450) and its components. In contrast, if the power supply (150) provides a nominal or greater than nominal level of power than the chipset (404) and CPU (406) may operate at, then the chipset (404) and CPU (406) may operate at full performance given the ample power available to the computing device (450) and its components.

Each voltage range of the power supply (150) may be calculated by the chipset (404) and CPU (406) such that the exact supply of power may be detected. In one example, the BIOS (405) may perform the task of converting the voltage into a matching power supply wattage based on Table 1 above or a look-up table stored in a register of the controller (140), chipset (404), CPU (406), or BIOS (405). In this manner, the power supply identification circuit (100) allows the BIOS (405) to determine the exact size of the power supply (150) and configure the system (400) to support all options at full performance or reduced performance based on the power available.

In one example, along with the BIOS (405), other devices may take action based on the size of the power supply (150) as detected by the adapter identification pin (141). For example, the controller (140) may include a preprogrammed minimum size threshold where if that threshold is not met, then the controller (150) may provide an error to the computing device (450) indicating an insufficient power adapter size is coupled to the computing device (450). The firmware and/or software included in the controller (140) in this example may be enhanced to perform this and other tasks similar to the processes performed by the BIOS (405) described herein.

Figure 5:
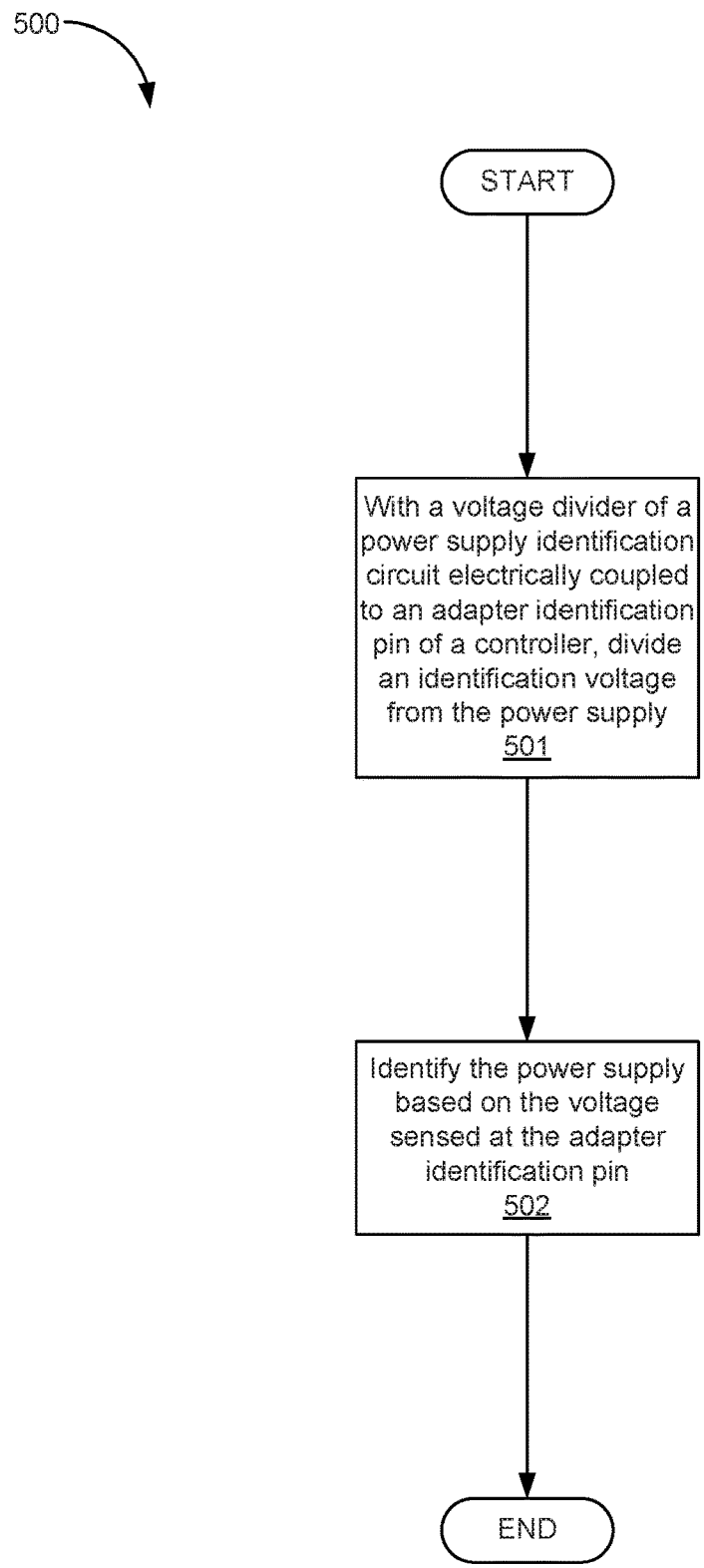
FIG. 5 is a flowchart showing a method of identifying a power supply, according to an example of the principles described herein.

FIG. 5 is a flowchart showing a method (500) of identifying a power supply (150), according to an example of the principles described herein. The method may begin by dividing (block 501) an identification voltage from the power supply (150) with a voltage divider (101) of a power supply identification circuit (100). The power supply identification circuit (100) is electrically coupled to an adapter identification pin (141) of a controller (140). The power supply (150) is identified (block 502) based on the voltage sensed at the adapter identification pin (141).

Figure 6:
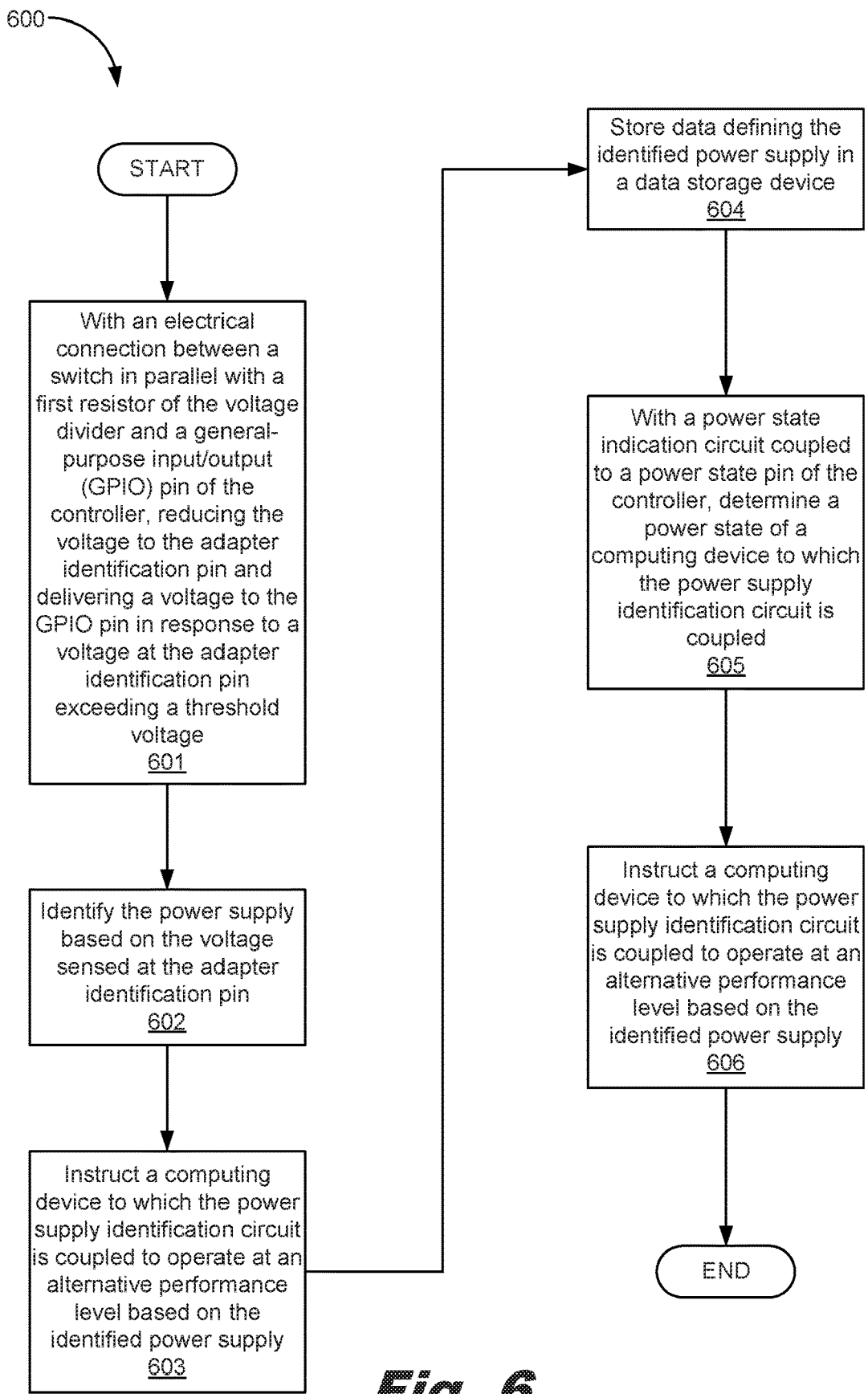
FIG. 6 is a flowchart showing a method of identifying a power supply, according to an example of the principles described herein.

FIG. 6 is a flowchart showing a method (600) of identifying a power supply (150), according to an example of the principles described herein. The method (600) of FIG. 6 may include dividing an identification voltage from the power supply (150) with a voltage divider (101) of a power supply identification circuit (100). This may include reducing (block 601) the voltage to the adapter identification pin (141) and delivering a voltage to the GPIO pin (142) in response to a voltage at the adapter identification pin (141) exceeding a threshold voltage. Block 601 may be accomplished using an electrical connection between a switch (Q3) in parallel with a first resistor (130) of the voltage divider and the GPIO pin (142) of the controller (140).

The method (600) may also include identifying (block 602) the power supply (150) based on the voltage sensed at the adapter identification pin (141), and instructing a computing device (450) to which the power supply identification circuit (100) is coupled to operate at an alternative performance level based on the identified power supply (150).

In one example, data defining the identified power supply (150) may be stored (block 604) in a data storage device. In an example, the data storage device may be a register included within the controller (140), the chipset (404), the CPU (406), the BIOS (405), or combinations thereof.

Further, the power supply identification circuit (100) may also be used to determine an operating power state of the computing device (450). With a power state indication circuit coupled to a power state pin (143) of the controller (140), the power state of the computing device (450) to which the power supply identification circuit (100) is coupled may be determined (block 605). Further, in one example, the method (600) may include instructing the computing device (450) to which the power supply identification circuit (100) is coupled to operate at an alternative performance level based on the identified power supply (150).

In an example, the system may support universal serial bus (USB)Type-C power deliver. In this example, the circuit (100) will detect that no power supply is coupled to the computing device (201, 450) and the controller (140) has power when the voltage at the adapter identification pin (141) is less than or equal to 88 millivolts (mV). In this state, the controller (140) may assume that a USB Type-C power input is powering the computing device (201) and may not assert a boot process within the computing device (201).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processing device of the computing device (450) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a circuit for identifying a power supply. The circuit for identifying a power supply includes a voltage divider to divide an identification voltage from the power supply. The output of the voltage divider is electrically coupled to an adapter identification pin of a controller to identify the power supply. Further, a system for identifying a power supply may include a controller of a computing device to control voltage supplied to the computing device and a power supply identification circuit coupled to the controller. The power supply identification circuit includes a voltage divider to divide an identification voltage from the power supply. The output of the voltage divider is electrically coupled to an adapter identification pin of the controller to identify the power supply.

The examples described herein use a single GPIO pin as opposed to a GPIO for every possible power supply that may be coupled to the computing device. Further, the examples described herein allow any adapter or power supply supported to be automatically detected without using a GPIO power source wattage level. The BIOS uses this information to support more configuration without the need for a hardware change. Further, more configurations and options may be supported easily, and the BIOS may configure the system for optimal performance depending on the power source attached. Further, instead of providing a GPIO pin per power source that may be used in powering the computing device, the examples described herein may function without the knowledge of the number of power sources ahead of time and does not implement the number of corresponding GPIOs in hardware at the time of detection. Thus, when a new configuration is added later and a different power source is utilized, a new GPIO is not needed since the single GPIO can detect the new power source.

The preceding description has been presented to illustrate and describe examples of the principles described. This description is not intended to be exhaustive or to limit these principles to any precise form disclosed. Many modifications and variations are possible in light of the above teaching.

What is claimed is:

1. A circuit for identifying a power adapter, comprising:
an input to receive power from an alternating current (AC) power adapter that draws power from an AC power grid;
a voltage divider to divide an identification voltage from the power adapter,
wherein the output of the voltage divider is electrically coupled to an adapter identification pin of a controller to identify the power adapter; and
an electrical connection between a switch in parallel with a first resistor of the voltage divider and a general-purpose input/output (GPIO) pin of the controller,
wherein, in response to a voltage at the adapter identification pin exceeding a threshold voltage, the switch reduces the voltage to the adapter identification pin and delivers a voltage to the GPIO pin.

2. The circuit of claim 1, wherein the reduced voltage is within a voltage range measurable at the adapter identification pin.

3. The circuit of claim 1, wherein the controller is a super input/output (SIO) controller integrated circuit.

4. The circuit of claim 1, wherein a first resistor and a second resistor of the voltage divider comprise a tolerance that varies ±0.5% or less.

5. The circuit of claim 1, comprising an analog-to-digital converter (ADC) within the controller,
wherein the reduced voltage is within a voltage range measurable by the ADC.

6. The circuit of claim 1, comprising a power state indication circuit coupled to a power state pin of the controller to define a power state of a computing device.

7. A system for identifying a power supply, comprising:
a controller of a computing device to control voltage supplied to the computing device;
a power supply identification circuit coupled to the controller, the power supply identification circuit comprising:
an input to receive power from an alternating current (AC) power adapter that draws power from an AC power grid; and
a voltage divider to divide an identification voltage from the power adapter,
wherein the output of the voltage divider is electrically coupled to an adapter identification pin of the controller to identify the power adapter;
a Basic Input/Output System (BIOS) to receive, from the controller, an identification of the power adapter, the BIOS to use the output of the power identification circuit to determine a size of the power supply available from the adapter and configure a computer system with a Central Processing Unit (CPU) and other power-consuming elements to support options available from the computer system in either a full or reduced performance mode based on power available from the power adapter; and
an electrical connection between a switch in parallel with a first resistor of the voltage divider and a general-purpose input/output (GPIO) pin of the controller,
wherein, in response to a voltage at the adapter identification pin exceeding a threshold voltage, the switch reduces the voltage to the adapter identification pin and delivers a voltage to the GPIO pin.

8. The system of claim 7, wherein the identification of the power adapter provided to the BIOS is in terms of wattage of the power adapter.

9. The system of claim 7, wherein the controller is a super input/output (SIO) controller integrated circuit.

10. The system of claim 7, wherein a first resistor and a second resistor of the voltage divider comprise a tolerance that varies ±0.5% or less.

11. The system of claim 7, comprising an analog-to-digital converter (ADC) within the controller to convert an input analog signal at the adapter identification pin to a digital number representing the input analog signal that identifies the power adapter,
wherein the reduced voltage is within a voltage range measurable by the ADC, the range comprising 2.5 volts or less.

12. The system of claim 7, comprising a power state indication circuit coupled to a power state pin of the controller to indicate a power state of the computing device.

13. The system of claim 7, wherein the power supply is an internal component of the computing device.

14. A method of identifying a power supply, comprising:
with a voltage divider of a power supply identification circuit electrically coupled to an adapter identification pin of a controller, dividing an identification voltage from the power supply,
identifying the power supply based on the voltage sensed at the adapter identification pin; and
instructing a computing device to which the power supply identification circuit is coupled to operate at an alternative performance level based on the identified power supply when the power supply, as identified, does not support operation of all options at a full performance level;
wherein dividing the identification voltage from the power supply comprises, with an electrical connection between a switch in parallel with a first resistor of the voltage divider and a general-purpose input/output (GPIO) pin of the controller, reducing the voltage to the adapter identification pin and delivering a voltage to the GPIO pin in response to a voltage at the adapter identification pin exceeding a threshold voltage.

15. The method of claim 14, comprising storing data defining the identified power supply in a data storage device.

16. The method of claim 14, comprising, with a power state indication circuit coupled to a power state pin of the controller, determining a power state of a computing device to which the power supply identification circuit is coupled.

* * * * *